United States Patent Office 3,793,383
Patented Feb. 19, 1974

3,793,383
SELECTIVE HYDROGENATION OF AROMATICS
Marvin M. Johnson and Gerhard P. Nowack, Bartlesville, Okla., assignors to Phillips Petroleum Company
No Drawing. Continuation-in-part of abandoned application Ser. No. 177,131, Sept. 1, 1971. This application July 13, 1972, Ser. No. 271,577
Int. Cl. C07c 5/10
U.S. Cl. 260—667     11 Claims

ABSTRACT OF THE DISCLOSURE

Aromatics are hydrogenated by contacting same with hydrogen and a ruthenium catalyst under hydrogenation conditions in the presence of an organic nitrogen-containing compound which functions as a reaction modifier.

---

This is a continuation-in-part application of our copending application having Ser. No. 177,131, filed Sept. 1, 1971, entitled "Selective Partial Hydrogenation of Aromatics," now abandoned.

This invention relates to the partial or complete hydrogenation of aromatics. In accordance with one aspect, this invention relates to selective partial or complete hydrogenation of aromatics with a ruthenium catalyst. In accordance with a further aspect, this invention relates to the selective partial or complete hydrogenation of aromatics with a ruthenium catalyst in the presence of a nitrogen-containing compound as the reaction modifier. In accordance with a further aspect, aromatics such as benzene and toluene are selectively hydrogenated to substantial amounts of cyclohexene and methylcyclohexene by contacting same with a ruthenium catalyst in the presence of an organic nitrogen-containing compound as the reaction modifier. In accordance with another aspect, non-condensed polyaromatic compounds such as biphenyl or terphenyl are selectively hydrogenated to aryl cyclohexane compounds by contacting with a ruthenium catalyst in the presence of an organic nitrogen-containing compound as the reaction modifier.

In the catalytic hydrogenation of organic compounds containing two or more reducible groups, it is frequently desired to hydrogenate one or more of these groups while leaving one or more of the remaining reducible groups unhydrogenated. It is possible to achieve this end by the selection of a suitable catalyst and operating conditions, but selectivity to a desired cyclic olefin is low and continued research efforts attempt to improve the selectivity of various catalysts to produce desired products.

Unsaturated cyclic hydrocarbons, such as cyclohexene, are in substantial demand particularly in the polymerization field. The problem is the relatively high cost and the relative difficulty with which such compounds are manufactured. The present invention contributes to the solution of the problem by providing an alternative route to the production of such mono-unsaturated cyclic compounds.

Phenylcyclohexane is a compound of commercial importance and has principal utility as a solvent and plasticizer in the plastics, coatings and adhesives fields. It is also utilized as a penetrating agent. The high boiling point of phenylcyclohexane together with a freezing point well below normal or room temperature render it highly suited for the purposes stated. It is also useful as an intermediate in the production of cyclohexene which in turn can be utilized for the production of adipic acid and caprolactam. It can also be converted in high yield to phenol and cyclohexanone by water oxidation.

In accordance with the invention, it has been found that substantial amounts of cyclic olefins such as cyclohexene and alkyl-substituted cyclohexenes can be produced by the selective partial hydrogenation of aromatics, such as benzene and toluene, as well as condensed polyaromatic compounds, by carrying out the hydrogenation in the presence of a ruthenium catalyst and selective organic nitrogen-containing compounds, as reaction modifiers. Further in accordance with the invention, non-condensed polyaromatic compounds are selectively hydrogenated to aryl cycloparaffin compounds by carrying out the hydrogenation in the presence of a ruthenium catalyst and selected organic nitrogen-containing compounds as reaction modifiers.

Accordingly, an object of this invention is to provide an improved process for the hydrogenation of aromatics.

A further object of this invention is to provide an improved process for the production of cyclic olefins from aromatics.

A further object of this invention is to provide an improved process for the production of aryl cycloparaffin compounds from noncondensed polyaromatic compounds.

A further object of this invention is to provide an improved catalyst which is selective for the partial hydrogenation of aromatics.

A still further object of this invention is to provide a commercially feasible process for the production of cyclic olefins and aryl cycloparaffins from aromatics.

Other objects and aspects, as well as the several advantages of the invention, will be apparent to one skilled in the art upon reading the specification and the appended claims.

In accordance with the invention set forth in said copending application, aromatics are selectively partially hydrogenated to cyclic olefins by contacting same under hydrogenation conditions with a ruthenium catalyst in the presence of an organic nitrogen-containing compound as a reaction modifier.

It has been further found that noncondensed polyaromatic compounds such as biphenyl or terphenyl can be selectively hydrogenated to aryl cyclo-paraffin compounds by contacting under hydrogenation conditions with a ruthenium catalyst in the presence of an organic nitrogen-containing compound as a reaction modifier.

It has also been found that condensed polyaromatic compounds having fused ring systems can be converted to olefins by contacting under hydrogenation conditions with a ruthenium catalyst as defined herein.

More specifically according to the invention, it has been found that cyclic olefins such as cyclohexene and alkyl-substituted cyclohexenes can be produced from aromatics by the selective partial hydrogenation by contacting the aromatics with a ruthenium catalyst in the presence of selective organic nitrogen-containing compounds as reaction modifiers.

In accordance with another embodiment, biphenyl can be selectively ydrogenated to phenylcyclohexane (cyclohexylbenzene) and terphenyl can be selectively hydrogenated to 4-cyclohexylbiphenyl and/or 1,4-dicyclohexylbenzene, by contacting under hydrogenation conditions with a ruthenium catalyst in the presence of selective organic nitrogen-containing compounds as reaction modifiers. If the polyaromatic compounds are substituted with alkyl groups, the corresponding products will also be alkyl-substituted. For example, 4,4'-dimethylbiphenyl can be hydrogenated to 4-(4-methylcyclohexyl)toluene.

The feedstocks set forth in said copending application which are suitable for use in the present invention process are aromatic compounds represented by the generic formula:

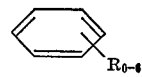

wherein R is an aromatic or a saturated aliphatic hydrocarbon radical such that the total number of carbon atoms in the entire molecule does not exceed about 20.

Some specific examples of these are benzene, toluene, the xylenes, biphenyl, terphenyl, hexamethylbenzene, 1-methyl-4-cyclohexylbenzene, 1-isobutyl-3,4-diethylbenzene, and the like, and mixtures thereof.

The feedstocks which are applicable to the selective hydrogenation process of the present invention are selected from (a) mononuclear aromatic compounds and alkyl derivatives thereof, (b) condensed polyaromatic compounds and alkyl derivatives thereof, and (c) noncondensed polyaromatic compounds and alkyl derivatives thereof.

Some preferred compounds of (a) are represented by the formula

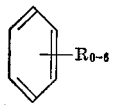

wherein R is a saturated aliphatic hydrocarbon radical having 1–14 carbon atoms, wherein two R groups can be joined to form a ring, and wherein the total number of carbon atoms in the molecule does not exceed about 20. Some examples of these are benzene, toluene, the xylenes, 1,4-diheptylbenzene, tetrahydronaphthalene, and the like, and mixtures thereof.

Some preferred compounds of (b) are represented by the formula

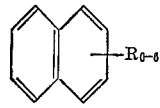

wherein R is as defined above, wherein two R groups can be joined to form a ring, and wherein the total number of carbon atoms in the molecule does not exceed about 20. Some examples are naphthalene, 1,2-dimethyl naphthalene, 1-decylnaphthalene, and the like, and mixtures thereof.

Some preferred compounds of (c) are represented by the formulas

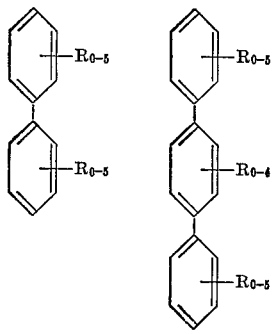

wherein R is as defined above, wherein two R groups can be joined to form a ring, and wherein the total number of carbon atoms in the molecule does not exceed about 50. Some examples are biphenyl, terphenyl, 2-ethylbiphenyl, 4,4'-dimethylbiphenyl, 3-octylbiphenyl, 1-ethylterphenyl, and the like, and mixtures thereof.

The aromatic nucleus of the carbocyclic aromatic compounds is completely or partially hydrogenated in accordance with the present invention to yield valuable hydrogenation product compound, for instance, cyclohexene when benzene is hydrogenated, methyl cyclohexene when toluene is hydrogenated, phenylcyclohexane when biphenyl is hydrogenated, octalin when naphthalene is hydrogenated, and 4-cyclohexylbiphenyl and/or 1,4-dicyclohexylbenzene when terphenyl is hydrogenated, and the like.

The invention is catalyzed by ruthenium. The ruthenium can be in the elemental state such as in the form of a powder, colloidal dispersion, or distributed on the surface of a high surface catalytic support. Such ruthenium catalysts are known in the art and their preparation is not necessarily part of this invention. For example, a conventional catalyst support such as alumina can be impregnated with an aqueous solution of a ruthenium halide salt, and the impregnated solid can be calcined and then contacted with a reducing atmosphere such as hydrogen. A finely divided dispersion of ruthenium can be prepared by reacting a ruthenium salt with aluminum metal.

The supported ruthenium catalysts are more convenient for vapor phase operations whereas the ruthenium dispersions can be used with effectiveness in liquid phase operations. When supported ruthenium catalysts are used, such catalysts will contain, generally, from about 0.001 weight percent to about 25 weight percent Ru, preferably 0.01–2 weight percent Ru. The ruthenium can be supported on conventional catalyst supports such as silica, alumina, titania, charcoal, and the like, and mixtures thereof, as well as on other difficultly reducible refractory materials.

Before use in the reaction zone, the supported ruthenium catalysts are conventionally treated, generally by a heat treatment as well as treatments with reducing agents such as hydrogen. In some instances, it is advantageous to contact the active catalyst with a carbon monoxide-containing gas prior to use in the reaction zone.

To achieve the selective results of the process of the present invention, the reaction mixture contains a reaction modifier. This modifier is a nitrogen-containing material represented by the following:

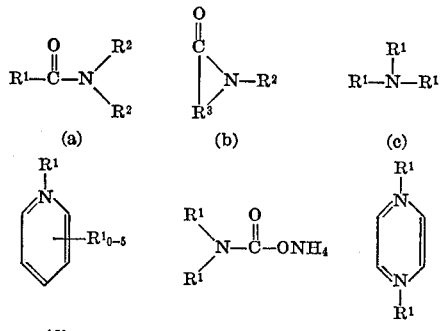

(g) mixtures of $NH_3$ and one or more of $NH_4HCO_3$, $(NH_4)_2CO_3$, and $CO_2$ wherein $R^1$ and $R^2$ are selected from hydrogen, and alkyl, aryl, cycloalkyl groups or combinations of these such as aralkyl or alkaryl, wherein $R^3$ is an alkylene radical having 2–5 carbon atoms; wherein the number of carbon atoms of compounds shown in compounds (a)–(f) does not exceed about 15; and wherein the mixture of (g) contains about 0.01–20 moles of $NH_4HCO_3$, $(NH_4)_2CO_3$, or $CO_2$ per mole of $NH_3$.

Preferably $R^1$ is hydrogen and each $R^2$ is a $C_1$–$C_4$ alkyl radical or a phenyl radical.

Some specific examples of the above-described modifiers are N,N-dimethylformamide, diethylformamide, formamide, N-methylformamide, N-methyl-N-phenylformamide, benzamide, diphenylformamide, N-methylpyrrolidone, N-ethylcaprolactam, ammonia, diethylamine, triethylamine, pyridine, aniline, N-methyl-N-cyclohexylammonium carbamate, ammonium carbamate, quinoline, and the like, and mixtures thereof.

According to the process of the present invention, the aromatic feedstock is brought into contact with the ruthenium catalyst, the reaction modifier, and with hydrogen at temperatures of 100–500° F., preferably 200–450° F. Any convenient pressure in the range of 0–2000 p.s.i.g. or higher can be used.

The reaction can be carried out either batchwise or continuously and any convenient contacting mode can be used. Continuous operation using a fixed catalyst bed reactor is presently preferred. In a continuous process the aromatic feed can be passed through the reactor at a rate of 0.1–20 WHSV. Except for the fact that small amounts will limit conversion, the amount of hydrogen in the reaction zone can vary appreciably depending upon other process conditions and can range from stoichiometric (based upon the desired rate of conversion to the desired product) to many times this figure. Generally speaking, the amount of hydrogen in the reaction zone will be 0.5–6 moles of hydrogen per mole of aromatic feedstock.

If desired, the aromatic feedstock can be diluted with a nonhydrogenatable diluent such as a saturated aliphatic hydrocarbon, but the conversion of undiluted aromatic feed is presently preferred.

The nitrogen-containing reaction modifier can be introduced into the reaction zone by any convenient means, but it is presently preferred to blend the modifier with the aromatic feedstock. Satisfactory operation can be obtained with aromatic feedstocks containing 0.01–10 weight percent, preferably 0.1–5 weight percent, of the nitrogen-containing modifier. It has been found that, on startup, relatively large amounts of modifier are sometimes beneficial for a short period of time.

The hydrogenation of the aromatic feed is, of course, an exothermic reaction and the reactor and procedure should be such that the heat of reaction can be rapidly and conveniently dissipated. Inadequate control of the reaction temperature can result in poor selectivity to desired products and even in a runaway reaction.

The catalyst system of the present invention is capable of long use without regeneration. However, should regeneration be required due to a significant loss of activity, this can be accomplished conveniently by a simple calcination of the ruthenium-containing catalyst system followed by a reduction step with a reducing agent such as hydrogen at an elevated temperature. In some instances, the catalyst activity can be restored significantly by merely washing with a hydrocarbon solvent.

After leaving the reaction zone, the effluent can be collected and separated using any conventional and suitable means. In the selective hydrogenation of benzene, for example, the resulting mixture of benzene, cyclohexane, and cyclohexene is somewhat difficult to separate by fractionation. However, the cyclohexene can be separated by liquid ammonia using extraction techniques within the skill of those in the separations art.

EXAMPLE I

In this run, benzene was converted to substantial quantities of cyclohexene by contact with hydrogen, a ruthenium/alumina catalyst, and a diethylformamide reaction modifier.

A Ru/Al$_2$O$_3$ catalyst (⅛-inch tablets containing 0.05 weight percent Ru) was charged into a reactor consisting of ½-inch stainless steel tubing. The catalyst charge was sufficient to make a 12-inch long catalyst bed. The reactor was immersed in a boiling liquid heat exchange medium to control the reaction temperature.

While maintaining a reactor temperature of 370–410° F., and a pressure of 750 p.s.i.g., benzene at 52 ml./hr. and a benzene solution containing 10 percent by weight diethylformamide at 40 ml./hr. were admitted into the reactor together with hydrogen at about 2 cu. ft./hr. The conversion to cracked products, cyclohexane, and cyclohexene were 0.09 percent, 30.5 percent, and 7.01 percent, respectively. The selectivity to cyclohexene was, therefore, 19 percent.

In the absence of any reaction modifier, such as a substituted formamide, the attempted hydrogenation of benzene using the ruthenium catalyst system results in a largely uncontrollable hydrogenation reaction which produces insignificant amounts of cyclohexene, if any.

EXAMPLE II

In a manner essentially similar to that of Example I described above, benzene was converted to substantial amounts of cyclohexene over a ruthenium catalyst using N-methyl-N-phenylformamide as a reaction modifier.

At a reactor temperature of 365–402° F., a pressure of 750 p.s.i.g., at a hydrogen flow rate of about 2 cu. ft./hr. and a benzene rate of 50 ml./hr., and at a benzene solution (containing 10 weight percent N-methyl-N-phenylformamide) rate of 48 ml./hr., analysis of the effluent showed conversion of the benzene to cracked products, cyclohexane and cyclohexene of 0.05 percent, 21.6 percent, and 5.76 percent, respectively. The selectivity to cyclohexene was, thus, 21 percent.

EXAMPLE III

In this example, benzamide was used as a reaction modifier.

A reactor similar to that of Example I was charged with a ruthenium/silica catalyst (⅛-inch pellets containing 0.5 weight percent Ru). A 25 ml. portion of the catalyst was diluted to 34 ml. with alpha-alumina (essentially inert) pellets making a bed about 17 inches long in the reactor. At a temperature of about 400° F., a pressure of about 500 p.s.i.g., a hydrogen rate of about 1.4 cu. ft./hr., and at a benzene (saturated with benzamide) rate of about 68 ml./hr., the benzene conversion to cracked products, cyclohexane and cyclohexene was found to be 0.06 percent, 0.98 percent, and 0.78 percent, respectively. The selectivity to cyclohexane was, thus, 43 percent

EXAMPLE IV

Diphenylformamide was used as a reaction modifier using a reactor and catalyst similar to that of Example III for the conversion of benzene to cyclohexene. At a reactor a hydrogen rate of about 1.4 cu. ft./hr., and at a benzene (containing 5 weight percent diphenylformamide) rate of about 120 ml./hr., the benzene was converted to cracked products, cyclohexane, and cyclohexene, with a conversion of 0.10 percent, 4.52 percent, and 2.32 percent, respectively.

EXAMPLE V

Benzene was converted to substantial amounts of cyclohexene using dimethylformamide as a reaction modifier.

Using a reactor and catalyst similar to that of Example I, and at a temperature of 427–440° F., a pressure of 500 p.s.i.g., a hydrogen rate of about 2 cu. ft./hr., a benzene rate of about 53 ml./hr., and a benzene solution (containing 10 weight percent dimethylformamide) rate of about 12 ml./hr., the benzene was converted to cracked products, cyclohexane, and cyclohexene, with conversions of 0.07 percent, 4.66 percent, and 3.45 percent, respectively. The selectivity to cyclohexane was, thus, 42 percent.

EXAMPLE VI

The conversion was carried out using N-methylformamide as a reaction modifier. Using a reactor and catalyst similar to that of the preceding example, a reactor temperature of about 401–431° F., a pressure of 500 p.s.i.g., a hydrogen flow rate of 1.7 cu. ft./hr., a benzene rate of about 56 ml./hr., and a benzene solution (containing 1 weight percent N-methylformamide) rate of about 6 ml./hr., the benzene was converted to cracked products, cyclohexane, and cyclohexene at conversions of 0.04 percent, 3.45 percent, and 1.54 percent, respectively. The selectivity to cyclohexene was, thus, 31 percent.

EXAMPLE VII

Benzene was converted to cyclohexene using an aqueous solution of ammonia, and ammonium bicarbonate as a reaction modifier. The reactor used was similar to those of the preceding examples. It was charged with a 10 gram portion of a Ru/Al$_2$O$_3$ catalyst (containing 0.5 weight percent Ru) which had been diluted to 30 ml. with alpha-alumina pellets. At a reactor temperature of 393–408° F., a pressure of 500 p.s.i.g., a hydrogen rate of 1.44 cu. ft./hr., a benzene rate of 14 ml./hr., and a modifier (aqueous solution containing 15 weight percent ammonia and 5 weight percent ammonium bicarbonate) rate of 46 ml./hr., the benzene was converted to cracked products, cyclohexane, and cyclohexene with conversions of 0.021 percent, 8.61 percent, and 8.32 percent, respectively.

EXAMPLE VIII

Toluene was converted to monounsaturated products using a ruthenium catalyst and an aqueous ammonia solution as a reaction modifier. Using a reactor similar to that of preceding examples containing a catalyst bed prepared from 20 g. of a 0.5 percent Ru on alumina catalyst diluted to 60 ml. with alpha-alumina pellets, a reactor temperature of 248–258° F., a pressure of 70 p.s.i.g., a hydrogen rate of about 2.58 cu. ft./hr., a toluene (50 weight percent solution in normal pentane) rate of 44 ml./hr., a modifier (50 weight percent concentrated ammonium hydroxide in water) rate of 32 ml./hr., the toluene was converted to methylcyclohexane and methylcyclohexenes with a conversion of 2.99 percent and 1.23 percent, respectively.

EXAMPLE IX

The conversion of benzene using a mixture of ammonia and carbon dioxide as modifiers was demonstrated. The reactor and catalyst were similar to that used in the preceding example. The carbon dioxide was introduced by blending 7.6 volume percent $CO_2$ in the hydrogen. The ammonia was introduced as a 12 weight percent solution in water. At a reactor temperature of 364–391° F., at 300 p.s.i.g., at a hydrogen (containing $CO_2$) rate of about 1.64 cu. ft./hr., at a benzene (50 weight percent mixture in normal pentane) rate of 57 ml./hr., and at a modifier (aqueous $NH_3$) rate of 72 ml./hr., the benzene was converted to cyclohexane and cyclohexene with conversions of 1.86 percent and 1.48 percent, respectively.

EXAMPLE X

Benzene was converted in this run using a mixture of water and dimethylformamide as a reaction modifier.

The reactor and catalyst were similar to those used in the preceding example. The conditions of the run included a reactor temperature of 390–407° F., a pressure of 500 p.s.i.g., a hydrogen rate of about 1.85 cu. ft./hr., a benzene (containing 5 weight percent dimethylformamide) rate of about 28 ml./hr., and a water rate of about 24 ml./hr. The benzene was converted to cracked products, cyclohexane, and cyclohexene with conversions of 0.10 percent, 14.9 percent, and 4.58 percent, respectively.

EXAMPLE XI

In this example, toluene was converted to monounsaturated products in the presence of a ruthenium catalyst in the form of a finely divided reaction product from ruthenium trichloride and aluminum metal. Dimethylformamide was used as the reaction modifier.

The catalyst was prepared by dissolving 0.50 g. of hydrated $RuCl_3$ in 30 ml. water. To this was added 0.83 g. of aluminum powder. A reaction was observed within a few minutes and hydrogen was evolved. After the reaction had subsided, 7.5 ml. of concentrated HCl was slowly added over a 30-minute period. Another 10 ml. of water was added, allowed to stand one hour, then heated to near boiling. The slurry was then filtered, washed with water and ethyl alcohol. The finely divided powder was then dried.

A 0.1094 g. quantity of the above-prepared ruthenium catalyst was charged into an autoclave together with 270 ml. toluene and 6 ml. dimethylformamide. The reactor was pressured with hydrogen at 900 p.s.i.g. and the temperature was raised in 50° F. increments over a period of time. At a temperature of 256° F., a sample was taken and analyzed by gas-liquid chromatography. The results, in area percent, show the following:

| | |
|---|---|
| 1-methylcyclohexene | 6.0 |
| 3-methylcyclohexene | 0.5 |
| Methylcyclohexane | 50.0 |
| Toluene | 43.5 |
| | 100.0 |

EXAMPLE XII

The selective hydrogenation of toluene, using a ruthenium catalyst and an N-methylpyrrolidone modifier, was carried out.

A 40 mg. quantity of the Ru catalyst prepared in Example XI was charged into a flask which was evacuated and filled with hydrogen. A 10 ml. quantity of toluene and a 5 ml. quantity of N-methylpyrrolidone was added to the flask. It was observed that hydrogen was absorbed rapidly. Analysis showed a toluene conversion of about 3 percent to products including small amounts of methylcyclohexenes.

EXAMPLE XIII

In this example, benzene was converted to cyclohexene over a CO-treated $Ru/Al_2O_3$ catalyst in the presence of a pyridine reaction modifier.

A 10 gram quantity of a 0.5 weight percent Ru on alumina catalyst was diluted to 60 ml. with alpha-alumina pellets and charged into a ½-inch stainless steel tubular reactor. The catalyst was pretreated with a stream of hydrogen containing 4 volume percent carbon monoxide at 170° F. and 200 p.s.i.g. for about 16 hours.

At a reactor temperature of about 240° F., a pressure of 200 p.s.i.g., a hydrogen rate of about 1.05 cu. ft./hr., and at a benzene (containing 5 weight percent pyridine) rate of about 36 ml./hr., the benzene was converted to cyclohexane and cyclohexene at conversions of 6.72 percent and 2.56 percent, respectively.

The pyridine modifier appears to be considerably more effective with such a CO-treated ruthenium catalyst.

EXAMPLE XIV

Benzene was converted to cyclohexene over a ruthenium catalyst in the presence of an aniline reaction modifier.

The reactor and catalyst used in this run were similar to those of the preceding example. At a reactor temperature of about 239–246° F., at 200 p.s.i.g., at a hydrogen rate of about 1.07 cu. ft./hr., and at a benzene (a normal pentane solution containing 10 percent benzene and 5 weight percent aniline) of about 78 ml./hr., benzene was converted to cyclohexane and cyclohexenes with conversions of 59.9 percent and 1.46 percent, respectively.

EXAMPLE XV

Triethylamine was used as the modifier in the hydrogenation of benzene to cyclohexene over a ruthenium catalyst. The reactor was a stainless fixed bed reactor charged with 60 ml. of a 0.5 Ru on alumina catalyst in the form of ⅛-inch pellets. The reactor was operated at 210–220° F., 200 p.s.i.g., at a hydrogen rate of 1.15 cu. ft./hr., and at a benzene (containing 10 weight percent triethylamine) feed of about 44 ml./hr. Analysis of the effluent showed that about 12.8 percent of the benzene was converted to cyclohexane and 1.2 percent was converted to cyclohexene.

EXAMPLE XVI

Quinoline was used as a reaction modifier in the conversion of benzene to cyclohexene over a ruthenium catalytst.

Using the same reactor and catalyst as that of the preceding example, the benzene was converted at a reactor temperature of 237–261° F., at a pressure of 200 p.s.i.g., at a hydrogen flow of 1.08 cu. ft./hr., and at a benzene (containing 5 weight percent quinoline) rate of about 58 ml./hr. Analysis showed that about 40.0 percent of the benzene had been converted to cyclohexane and 1.07 percent had been converted to cyclohexene.

EXAMPLE XVII

Biphenyl was converted to phenylcyclohexane over a ruthenium catalyst in the presence of dimethylformamide reaction modifier.

The reactor and catalyst were similar to those used in the preceding examples. The reactor was charged with 10 ml. (10 g.) of the granular 0.5 percent Ru/alumina catalyst which had been diluted to 24 ml. with granular alpha-alumina (inert packing material). The same alpha-alumina was packed both above and below the catalyst-containing bed. A feedstream consisting of 15 weight percent biphenyl, 2 percent dimethylformamide, and 83 weight percent cyclohexane was passed through the reactor at 400° F., 200 p.s.i.g., 6.8 LHSV, and with a hydrogen flow of 41.5 l./hr. (STP). The effluent from the reactor was analyzed and the products were found to be as follows:

|  | Percent |
|---|---|
| Bicyclohexane | 1.49 |
| Cyclohexylcyclohexene | Trace |
| Phenylcyclohexane | 78.30 |
| Biphenyl | 20.21 |
|  | 100.00 |

The analysis shows the effectiveness of the process in converting biphenyl to phenylcyclohexane.

We claim:

1. A process for selectively partially hydrogenating aromatic hydrocarbons which comprises contacting a feedstock comprising aromatic hydrocarbons selected from (a) mononuclear aromatic hydrocarbons and alkyl derivatives thereof, (b) condensed polyaromatic hydrocarbons and alkyl derivatives thereof and (c) noncondensed polyaromatic hydrocarbons and alkyl derivatives thereof, hydrogen, a ruthenium catalyst, and a reaction-modifying amount of 0.01–10 weight percent based upon aromatic hydrocarbon present of an organic nitrogen-containing compound represented by the formulas

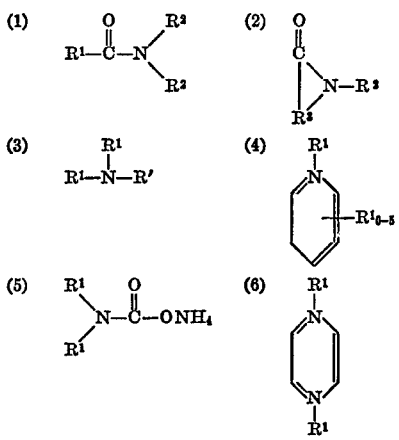

(7) mixtures of $NH_3$ and one or more of $NH_4HCO_3$, $(NH_4)_2CO_3$, and $CO_2$ wherein $R^1$ and $R^2$ are selected from hydrogen, and alkyl, aryl, cycloalkyl groups or combinations of these such as aralkyl or alkaryl, wherein $R^3$ is an alkylene radical having 2–5 carbon atoms; wherein the number of carbon atoms of compounds shown in compounds (1)–(6) does not exceed about 15; and wherein the mixture of (7) contains about 0.01–20 moles of $NH_4HCO_3$, $(NH_4)_2CO_3$, or $CO_2$ per mole of $NH_3$.

2. A process according to claim 1 wherein said contacting is effected at a temperature in the range 100–500° F. and a pressure in the range 0–2000 p.s.i.g., and further wherein the organic nitrogen-containing compound modifier is premixed with the aromatic feedstock prior to contacting with hydrogen.

3. A process according to claim 1 wherein the aromatic hydrocarbon compounds are represented by the formula

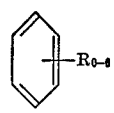

wherein R is a saturated aliphatic hydrocarbon radical having 1–14 carbon atoms, wherein two R groups can be joined to form a ring, and wherein the total number of carbon atoms in the molecule does not exceed about 20.

4. A process according to claim 1 wherein the aromatic is benzene or toluene and the cyclic olefin products produced are cyclohexene and methylcyclohexenes, respectively, and the ruthenium catalyst is supported by alumina.

5. A process for the production of cyclohexene from benzene according to claim 1 which comprises contacting benzene and hydrogen with a ruthenium alumina catalyst in the presence of 0.01–10 weight percent, based on benzene, of diethylformamide, N-methyl-N-phenylformamide, benzamide, diphenylformamide, dimethylformamide, N-methylformamide, an aqueous solution of ammonia and ammonium bicarbonate, a mixture of ammonia and carbon dioxide, pyridine, aniline, triethylamine, or quinoline, and recovering cyclohexene produced in the process.

6. A process for the production of methylcyclohexenes from toluene according to claim 1 which comprises contacting toluene and hydrogen with a ruthenium alumina catalyst in the presence of 0.01–10 weight percent, based on toluene, of an aqueous ammonia solution, dimethylformamide, 4-N-methylpyrrolidone modifier, and recovering methylcyclohexenes produced in the process.

7. A process according to claim 4 wherein the temperature during contacting is in the range of 100–500° F. and the pressure is in the range of 0–2000 p.s.i.g., and the modifier is premixed with benzene prior to contacting with hydrogen.

8. A process according to claim 4 wherein said ruthenium alumina catalyst is treated with carbon monoxide prior to contacting and the modifier is pyridine.

9. A process according to claim 6 wherein the temperature during contacting is in the range of 100–500° F. and the pressure is in the range of 0–2000 p.s.i.g., and the modifier is premixed with toluene prior to contacting with hydrogen.

10. A process according to claim 1 wherein the aromatic hydrocarbons are represented by the formulas

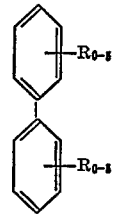

wherein R is a saturated aliphatic hydrocarbon radical having 1–14 carbon atoms, wherein two R groups can be joined to form a ring, and wherein the total number of carbon atoms in the molecule does not exceed about 50.

11. A process according to claim 10 wherein said aromatic hydrocarbon is biphenyl which is converted to phenylcyclohexane in the presence of dimethylformamide as a reaction modifier.

References Cited

UNITED STATES PATENTS

| 2,736,689 | 2/1956 | Stuart | 260—667 |
| 3,366,695 | 1/1968 | Luudeen | 260—667 |
| 3,268,608 | 8/1966 | De Rosset | 260—668 |
| 3,349,140 | 10/1967 | Weitkamp | 260—667 |
| 3,360,577 | 12/1967 | Pickles | 260—666 A |
| 3,446,863 | 5/1969 | Steffgen | 260—667 |

DELBERT E. GANTZ, Primary Examiner

V. O'KEEFE, Assistant Examiner